Sept. 17, 1957   L. G. DAVIES   2,806,418
AIR PROPULSION
Filed May 4, 1956   6 Sheets-Sheet 3

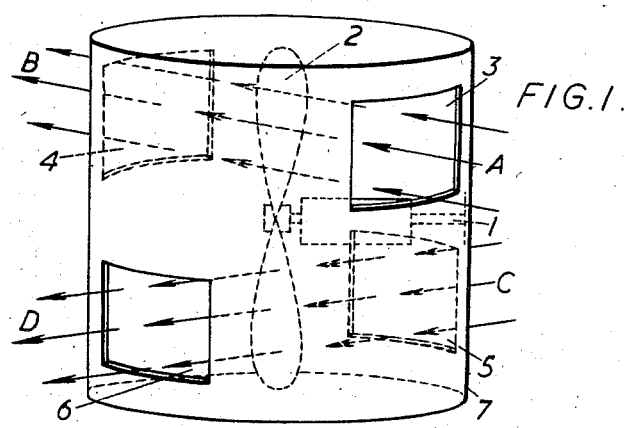
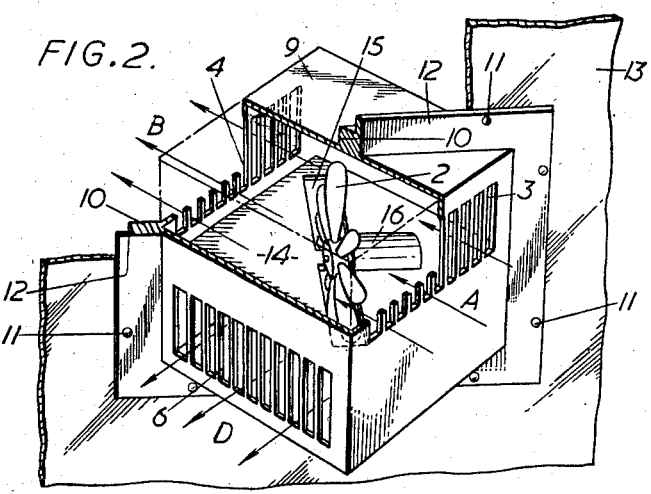
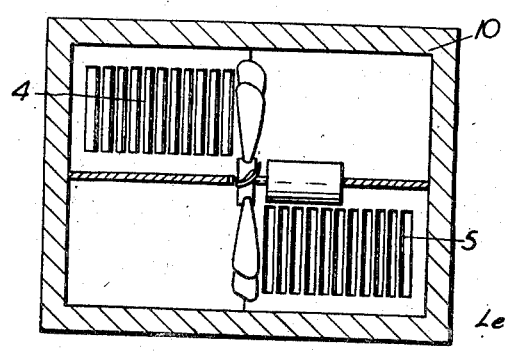

Inventor
Leonard Gordon Davies
By
Attorneys

Sept. 17, 1957 L. G. DAVIES 2,806,418
AIR PROPULSION
Filed May 4, 1956 6 Sheets-Sheet 4

Inventor
Leonard Gordon Davies
By
Attorneys

Sept. 17, 1957  L. G. DAVIES  2,806,418
AIR PROPULSION

Filed May 4, 1956  6 Sheets-Sheet 5

Inventor
Leonard Gordon Davies
By
Bailey Stephens & Huettig
Attorneys

Sept. 17, 1957     L. G. DAVIES     2,806,418
AIR PROPULSION
Filed May 4, 1956     6 Sheets-Sheet 6
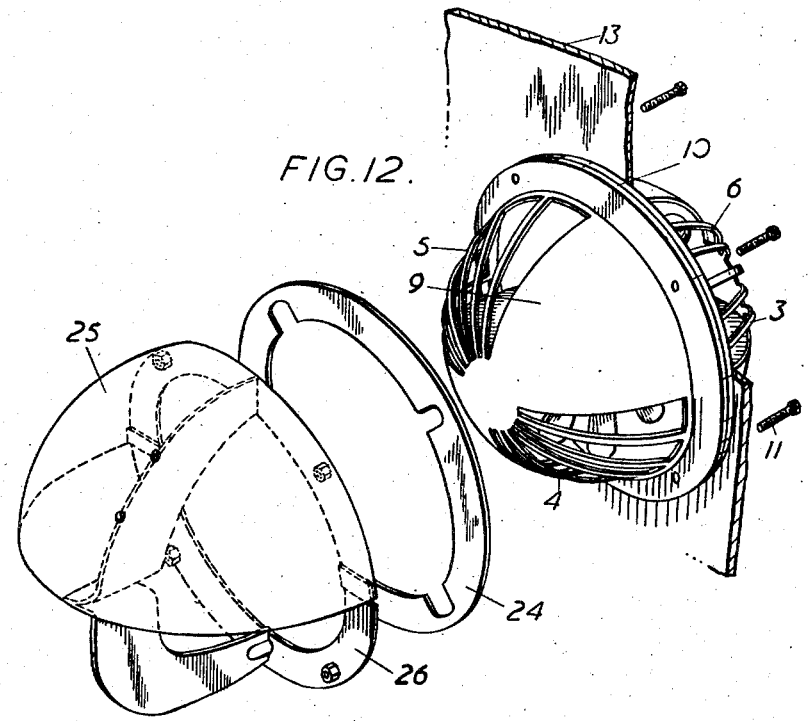
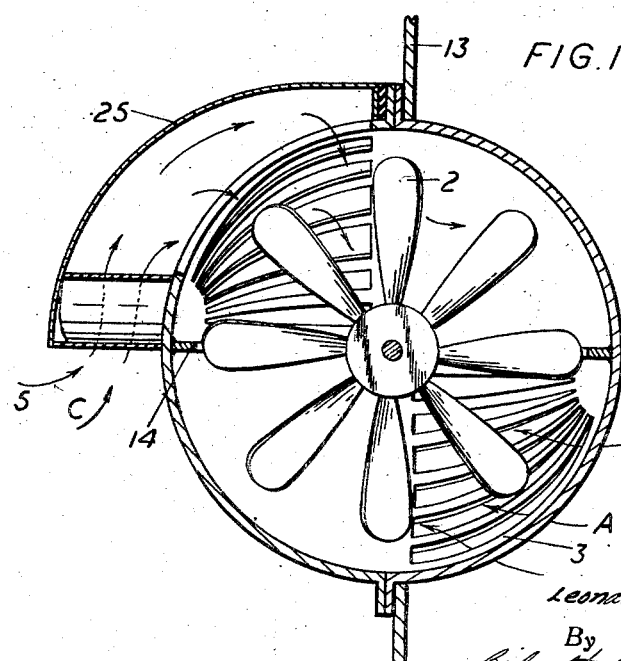
Inventor
Leonard Gordon Davies
By
Bailey Stephens & Huettig
Attorneys

United States Patent Office 2,806,418
Patented Sept. 17, 1957

2,806,418

AIR PROPULSION

Leonard Gordon Davies, Great Bookham, England

Application May 4, 1956, Serial No. 582,829

2 Claims. (Cl. 98—33)

The invention relates to an apparatus for ventilating an enclosed space such as a room or building. This application is a continuation-in-part of my application Serial No. 335,675, filed February 9, 1953, for "Air Propulsion" and now abandoned.

It is an object of the invention to provide an apparatus which may be fitted to a hole or window in the wall enclosing the space and which provides for delivery of air into the space to be ventilated and the extraction of air in equal quantity from the said space. It is a further object of the invention to provide such an apparatus in which a single impellor is located within a single housing provided with apertures such that airstreams are driven through the casing in opposite directions. In this way efficient ventilation without draughts from extraneous sources is possible. It is a further feature of the invention to provide means for adjusting as desired the proportion between the entrant and extracted air streams to provide for particular conditions of ventilation.

The invention includes as an essential feature an apparatus for ventilating an enclosed space comprising a housing having four apertures divided into two groups with each aperture lying in a different quadrant of a cylinder, the apertures of each group being opposed with a line through their centres intersecting the cylinder axis at different levels, and an impellor mounted in said housing on an axis lying in a plane passing between said centres, whereby one aperture of each group constitutes an inlet and the other aperture an outlet for two streams of air drawn through said casing by said impellor. The invention also comprises a ventilator for producing simultaneous inward and outward currents of air through a wall opening, comprising a housing, a single axial flow impellor rotatably mounted in said casing, two inlets and two outlets in said casing arranged in staggered opposed pairs with the axis passing through one inlet and one outlet in one pair being set screwwise to the axis of said impellor.

The cylinder above referred to in the location of the apertures may be the actual wall of the housing when a cylindrical housing is employed. However the invention is also applicable with housings of a shape other than cylindrical e. g. spherical or square and in such cases the cylinder is an imaginary circumscribed or inscribed cylinder which defines geometrically the position of the apertures.

Several embodiments of the invention are illustrated in the accompanying drawings which show as follows:

Figure 1 is a diagrammatic view showing the relationship between the impellor, the impellor axis and the apertures of the housing;

Figure 2 is an embodiment of the invention utilising a square housing in which the impellor is mounted on a slotted division plate;

Figure 3 is a section showing the apparatus illustrated in Figure 2 with the front half of the housing removed;

Figures 12 and 13 are views of an apparatus identical with that shown in Figures 10 and 11 but having an external cowl and deflecting rib.

Figure 4:
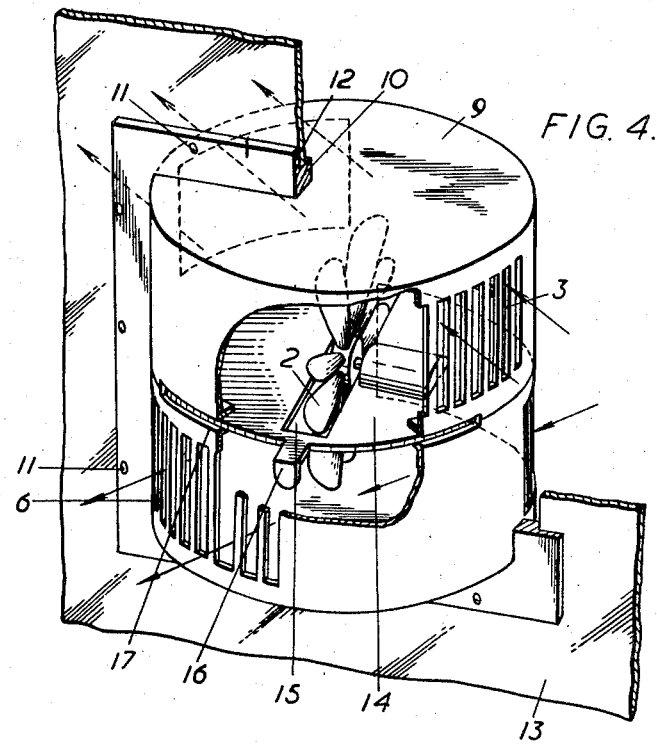
Figure 4 is a form of apparatus having a cylindrical housing and having the impellor mounted on a slotted division plate or partition which is rotatable within the housing.

In Figures 1 to 11 the device is seen from inside the space to be ventilated, whilst in Figures 12 and 13 it is viewed from outside.

Referring now to Figure 1 the apparatus comprises as its essential elements a shaft 1 upon which is mounted an impellor 2 surrounded by a housing having four apertures 3, 4, 5 and 6. Each aperture lies in a different quadrant of a cylinder diagrammatically shown at 7 the two apertures of each group being opposed with a line through their centres intersecting the axis of the cylinder 7 at different levels and the impellor 2 being mounted in said housing on an axis (i. e. the shaft 1) lying in a plane passing between the lines between the center of each of the apertures 3, 4 and 5, 6 so that one aperture of each group constitutes an inlet and the other aperture an outlet for streams of air drawn through the said casing by said impellor. In the figure air extracted passes in the direction of the arrows A into the housing through the aperture 3 and leaves the housing through the aperture 4 in the direction of the arrows B, whilst fresh air from the outside enters the housing through the aperture 5 in the direction of the arrows C, and leaves the housing through the aperture 6 in the direction of the arrows D.

Referring now to Figures 2 and 3 the apparatus comprises a square housing 9 having a projecting diagonal rib 10, with a projecting flange 12, drilled to receive screws 11, by which the housing is secured to the wall dividing the internal space to be ventilated from the outside air. Located within the housing 9 is a fixed division plate 14 which is slotted at 15 and upon which is mounted an impellor 2 and the driving motor 16 therefor, the impellor blades passing through the slot 15 in the division plate 14. Air is drawn into the housing through the apertures 3 and 5 and emerges from the housing through the apertures 4 and 6, as described for Figure 1. Consequently the single impellor 2 provides equal inward and outward ventilation. The apertures 3, 4, 5, 6 are formed by stamping the housing to form a guard grating.

Figure 5:
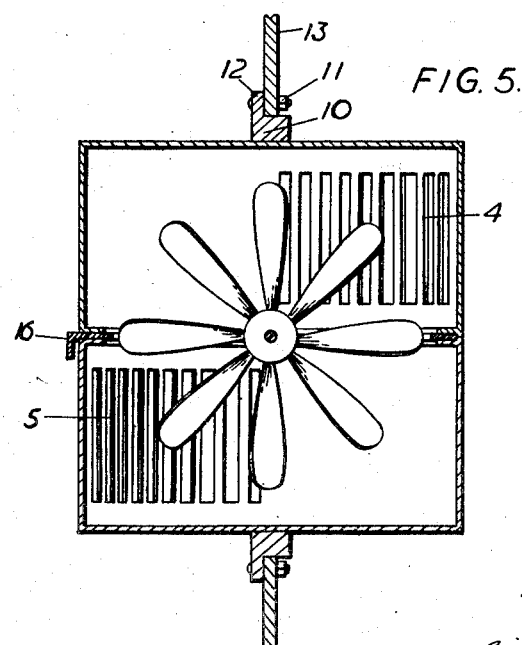
Figure 5 is a section of the apparatus shown in Figure 4 the front half of the housing being removed.

Referring to Figures 4 and 5 the housing 9 is cylindrical and has a projecting rib 10 and side flange 12 as in Figure 2. Within the casing there is rotatably mounted a division plate 14 upon which is mounted the impellor 2 the blades of which pass through a slot 15 in the division plate 14, rotatably mounted in the housing 9, and having an adjusting tab 16, extending through a slot 17 in the housing. The device when in the position shown in Figure 4 with the tab 16 in the middle of the slot 17 provides equal inward and outward ventilation air being drawn from the space to be ventilated through the aperture 3 and being ejected through the aperture 4, whilst air drawn in from the outside is brought into the housing through the aperture 5 and emerges from the housing through the aperture 6.

Figure 6:
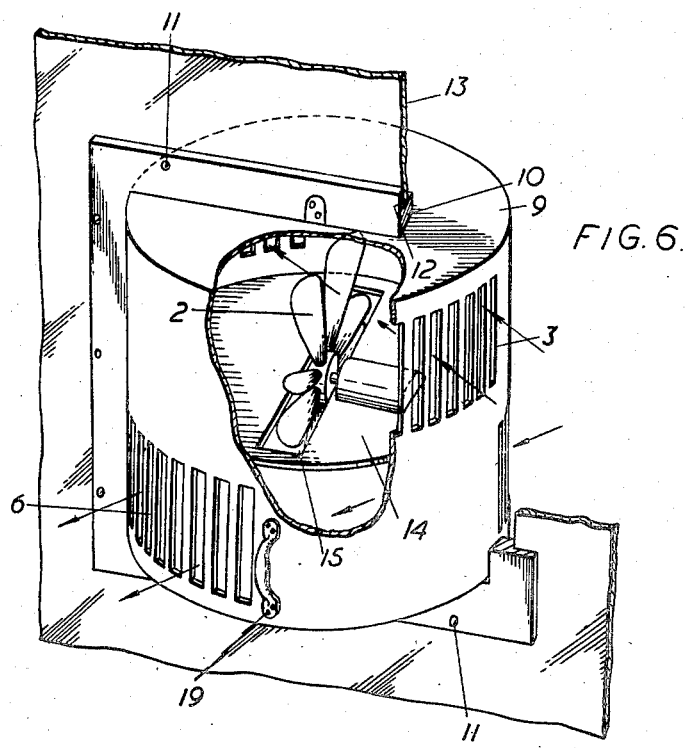
Figure 6 is a form of apparatus having a cylindrical housing with a fixed slotted division plate or partition, the casing being rotatably mounted in the wall enclosing the space to be ventilated.
Figure 7:
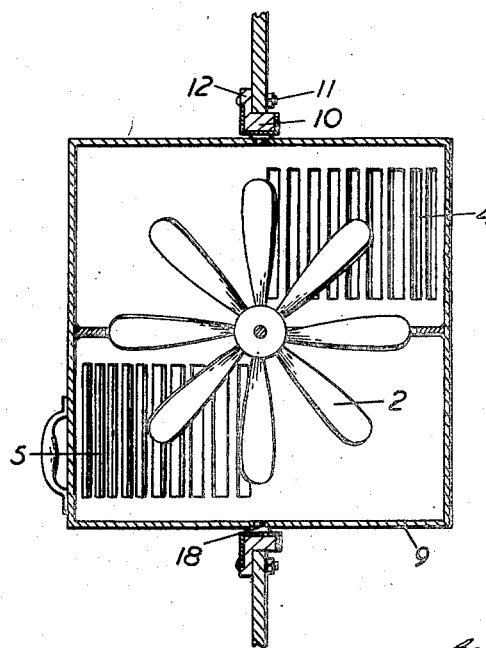
Figure 7 is a section of the apparatus shown in Figure 6 the front half of the housing being omitted.

Referring to Figures 6 and 7 the housing and impellor 2 are similar to those illustrated in Figures 4 and 5 but the division plate 14 is stationary within the casing. The housing 9 has trunnions 18 which support it within the rib 10, and carries a handle 19 by which the housing 9 may be rotated on the trunnions 18. The housing can accordingly be rotated so that the inlet apertures 3 and 5 or the outlet apertures 4 and 6 may both be brought within the space to be ventilated, so that all the air passing through the casing may be extracted from the space, or all admitted to the space when it is not desired to provide equal inward and outward ventilation.

Figure 8:
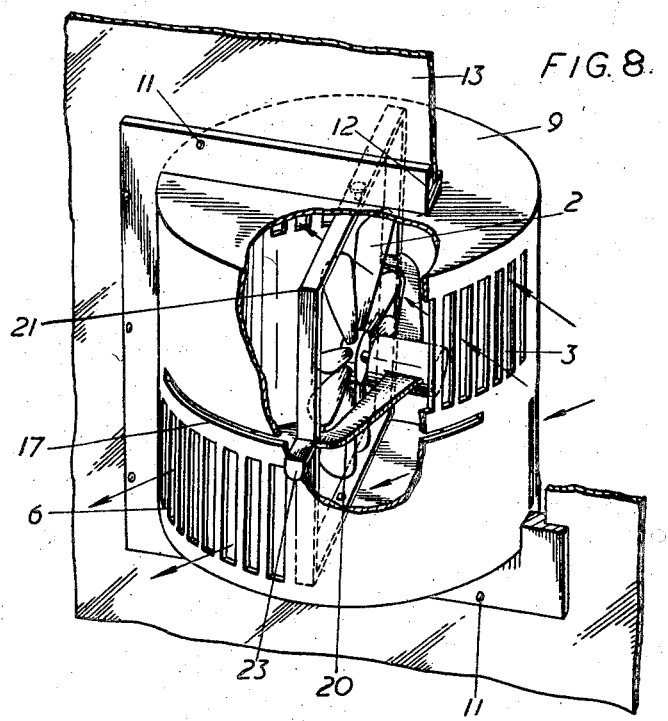
Figure 8 is a form of apparatus having a cylindrical housing but no division plate, the impellor being mounted on a carrier which is rotatable within the housing.
Figure 9:
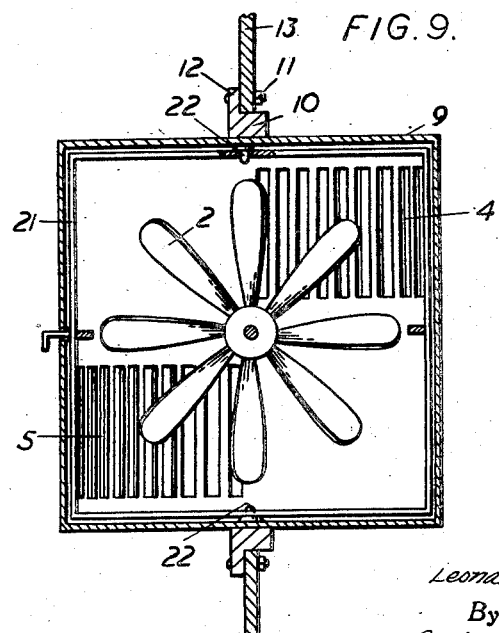
Figure 9 is a section of the form of apparatus shown in Figure 8, the front half of the casing being omitted.

Referring to Figures 8 and 9 the housing 9 and impellor 2 are broadly the same as those shown in Figures 4 and 5 but there is no division plate and the motor for the fan is carried by a two armed spider 20, mounted on a frame 21 rotatably mounted within the housing on trunnions 22 and having an externally projecting tab 23 extending through the slot 17 in the casing. With the tab 23 in the position shown in Figure 8 inward and outward ventilation are equal but adjustment may be provided by moving the tab 23 along the slot 17.

Figure 10:
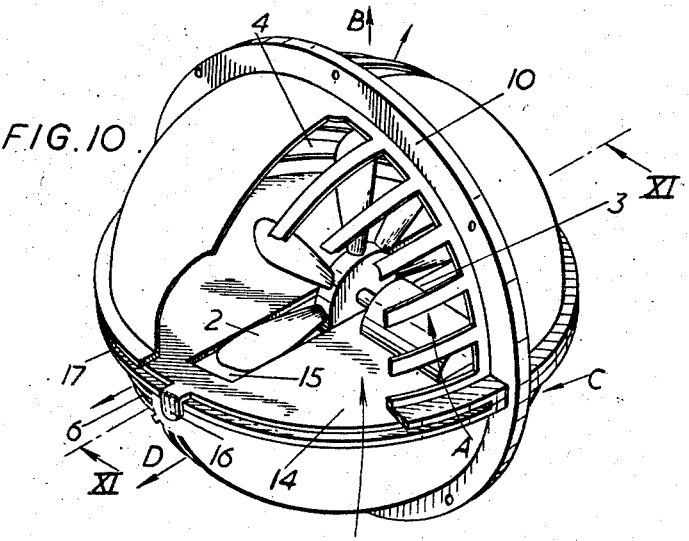
Figure 10 is an illustration of an embodiment in which the housing is spherical and there is provided a slotted division plate upon which the impellor is mounted which divison plate is rotatable within the housng.
Figure 11:
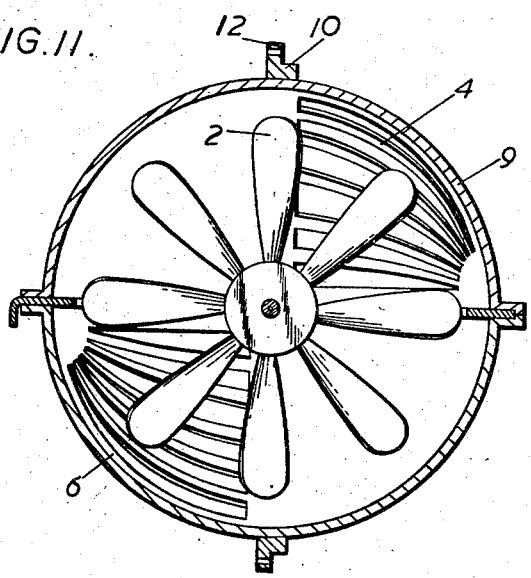
Figure 11 is a section along the line XI—XI of Figure 10.

Referring to Figures 10 and 11 the casing 9 is spherical and a mounting rib 10 is secured to the casing to provide that the apparatus may be attached to a hole in the partition or wall bounding the space to be ventilated. The casing has a slotted division plate 14 upon which the impellor 2 and its driving motor are mounted, the impellor blades passing through the slot 15 in the division plate 14. The division plate is rotatably mounted within the casing and has an externally projecting tab 16 which when the tab is in the position shown in Figure 10 provides equal inward and outward ventilation. By moving the tab the proportions between the inwardly and outwardly directed airstream may be varied.

Referring to Figures 12 and 13 the apparatus comprises a spherical housing and is generally identical with the apparatus shown in Figures 10 and 11 but the division plate 14 is fixed with the additional provision of an external cowl. The apparatus is however viewed from the outside and is shown in a slightly different rotational position. The rib 10 is drilled to accommodate the fixing screws 11 and there are provided an external gasket 24 and a cowl or weather shield 25 mounted on a drilled ring 26, secured to the housing 10 by the screws 11. In order to ensure that air leaving the housing 10 to the exterior is not deflected by the cowl 25 back into the housing through the aperture 5, it is advantageous to attach to the cowl 25 and ring 26, a dividing plate 27, which prevents such short circuiting by the cowl into the other aperture through which air is drawn from the outside.

I claim:

1. An apparatus for ventilating an enclosed space comprising a housing having four apertures divided into two groups with each aperture lying in a different quadrant of a cylinder, the apertures of each group being opposed with a line through their centers intersecting the cylinder axis at different levels, and an impellor mounted in said housing on an axis lying in a plane passing between the lines between said centers, whereby one aperture of each group constitutes an inlet and the other aperture an outlet for two streams of air drawn through said housing by said impellor.

2. A ventilator for producing simultaneous inward and outward currents of air through a wall opening, comprising a housing, a single axial flow impellor rotatably mounted in said housing, two inlets and two outlets in said housing arranged in staggered opposed pairs with the axis passing through one inlet and outlet in one pair being set skew-wise to the axis of said impellor.

References Cited in the file of this patent

UNITED STATES PATENTS

| | | |
|---|---|---|
| 1,050,994 | Ostrander | Jan. 21, 1913 |
| 2,212,050 | Samuelson | Aug. 20, 1940 |
| 2,405,411 | Dybvig | Aug. 6, 1946 |